US008532105B2

(12) United States Patent
Park

(10) Patent No.: US 8,532,105 B2
(45) Date of Patent: Sep. 10, 2013

(54) IMAGE FORMING APPARATUS, AND CONTROL METHOD AND INTERFACE APPARATUS THEREOF

(75) Inventor: Hyun-wook Park, Gwacheon-si (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 541 days.

(21) Appl. No.: 11/945,462

(22) Filed: Nov. 27, 2007

(65) Prior Publication Data

US 2008/0123641 A1  May 29, 2008

(30) Foreign Application Priority Data

Nov. 28, 2006  (KR) .................. 10-2006-0118637

(51) Int. Cl.
*G06F 15/16* (2006.01)
(52) U.S. Cl.
USPC ................. 370/392; 358/1.15; 709/204
(58) Field of Classification Search
None
See application file for complete search history.

(56) References Cited

U.S. PATENT DOCUMENTS

| 6,651,100 B2* | 11/2003 | Bush et al. ............... 709/224 |
| 6,819,443 B1* | 11/2004 | Shima et al. ............ 358/1.15 |
| 7,511,839 B2 | 3/2009 | Shoji et al. |
| 2003/0226050 A1* | 12/2003 | Yik et al. ................ 713/324 |
| 2004/0064506 A1* | 4/2004 | Ohara .................... 709/204 |
| 2005/0141018 A1 | 6/2005 | Oak et al. |
| 2005/0165956 A1 | 7/2005 | Lee |
| 2005/0204189 A1* | 9/2005 | Akiba ..................... 714/12 |
| 2006/0077976 A1 | 4/2006 | Park |
| 2006/0218440 A1* | 9/2006 | Inoue ..................... 714/12 |

FOREIGN PATENT DOCUMENTS

| KR | 10-2003-0029474 | 4/2003 |
| KR | 2005-56109 | 6/2005 |
| KR | 1020050067708 | 7/2005 |
| KR | 2005-77229 | 8/2005 |
| KR | 1020060032074 | 4/2006 |

OTHER PUBLICATIONS

Korean Office Action issued on Dec. 23, 2011 in KR Patent Application No. 10-2006-0118637.
KR Office Action issued Jun. 29, 2011 in KR Patent Application No. 10-2006-0118637.
Korean Notice of Allowance issued on Aug. 30, 2012 in KR Patent Application No. 10-2006-0118637.

* cited by examiner

*Primary Examiner* — Melanie Jagannathan
(74) *Attorney, Agent, or Firm* — Stanzione & Kim, LLP

(57) ABSTRACT

An image forming apparatus includes a MAC controller that receives a data packet containing print data from a host apparatus via a network, a central processing unit (CPU) that processes the data packet received by the MAC controller, and a printing unit that performs a printing operation on the basis of the print data processed by the CPU, wherein MAC controller selectively transmits the data packet to the CPU depending on whether the data packet received from the host apparatus corresponds to a predetermined receivable protocol type.

9 Claims, 4 Drawing Sheets

IMAGE FORMING APPARATUS, AND CONTROL METHOD AND INTERFACE APPARATUS THEREOF

CROSS-REFERENCE TO RELATED APPLICATIONS

This application claims priority from Korean Patent Application No. 10-2006-0118637, filed on Nov. 28, 2006 in the Korean Intellectual Property Office, the disclosure of which is incorporated herein by reference in its entirety.

BACKGROUND OF THE INVENTION

1. Field of the Invention

Apparatuses and methods consistent with the present general inventive concept relate to an image forming apparatus, a control method and an interface apparatus thereof, and more particularly, to an image forming apparatus that performs a printing operation for print data obtained from data packets received via a network, and a control method and an interface apparatus thereof.

2. Description of the Related Art

An image forming apparatus such as a network printer receives data packets containing print data from a host apparatus such as a computer system and forms an image on a printing medium such as a paper by performing a print operation for the print data obtained from the received data packets.

Typically, an image forming apparatus that receives the data packets of print data via a network includes a central processing unit (CPU), a random access memory (RAM), a media access control (MAC) controller, an image processing unit, a printing unit, etc. The MAC controller receives the data packets containing the print data from a host apparatus, processes the received print data packets, stores the processed print data packets in the RAM, and interrupts the CPU. When the CPU is interrupted, the CPU performs a data processing corresponding to a protocol of the data packets, such as Transmission Control Protocol/Internet Protocol (TCP/IP). Next, the image processing unit performs an image processing for the print data obtained from the data packets to generate a print image and the printing unit performs a printing operation based on the generated print image.

However, since the MAC controller has to use system resources such as the CPU or a system bus in order to process the received data packets, it is necessary to minimize unnecessary data packets processing in order to improve system performance. The MAC controller may have a function of filtering unicast data packets having an incorrect destination MAC address or preventing certain multicast data packets or broadcast data packets from being received.

However, even when the MAC controller receives unicast data packets having a correct destination MAC address, the MAC controller may have difficulty in properly filtering received data packets to obtain required data packets, since the received unicast data packets are analyzed to be useless or the received multicast data packets or broadcast data packets are needed depending on their upper protocol types.

In this connection, although Korean Patent Publication Number 10-2005-0077229 discloses a MAC controller having an additional function of filtering IP/ARP data packets, the MAC controller of this application has limited applicability to only a particular protocol type of Internet Protocol/Address Resolution Protocol (IP/ARP). In addition, although Korean Patent Publication Number 10-2005-0056109 discloses a technique of detecting data packet congestion and limiting data packet receipt in a particular situation so as to perform a particular operation without any problem, this technique has also a problem in that data packets of an unnecessary protocol type can not be completely filtered.

SUMMARY OF THE INVENTION

The present general inventive concept provides an image forming apparatus which is capable of minimizing a system load by selectively transmitting data packets of print data received according to a protocol type, a control method thereof, and an interface apparatus.

Additional aspects of the present general inventive concept will be set forth in part in the description which follows and, in part, will be obvious from the description, or may be learned by practice of the present general inventive concept.

The foregoing and/or other aspects of the present general inventive concept may be achieved by providing an image forming apparatus including an image forming apparatus including a MAC controller to receive a data packet containing print data from a host apparatus via a network, a central processing unit (CPU) to process the data packet received by the MAC controller, and a printing unit to perform a printing operation on the basis of the print data of the data packet processed by the CPU, wherein the MAC controller controls the data receiving unit to selectively transmit a data packet to the CPU depending on whether the data packet received from the host apparatus corresponds to a predetermined receivable protocol type.

The image forming apparatus may further include a main memory used in the processing of the CPU, wherein the MAC controller a memory unit in which the data packet received from the host apparatus is stored and a direct memory access (DMA) unit that reads the data packet stored in the memory unit and transmits the stored data packet to the main memory.

The MAC controller may transmit information related to a protocol type of the transmitted data packet to the main memory.

The receivable protocol type may depend on an Open Systems Interconnection (OSI) reference model.

The MAC controller may be integrally formed on a system-on-a-chip (SOC).

The foregoing and/or other aspects of the present general inventive concept may be achieved by providing a control method of an image forming apparatus including a central processing unit (CPU) that processes a data packet containing print data, and a printing unit that performs a printing operation on the basis of the print data of the data packet processed by the CPU, the control method including receiving the data packet from a host apparatus via a network, parsing the received data packet to determine the protocol type, and selectively transmitting the data packet to the CPU depending on whether the predetermined protocol type corresponds to a predetermined receivable protocol type.

The control method may further include storing the data packet received from the host apparatus, wherein selectively transmitting the data packet includes reading in a direct memory access (DMA) manner the stored data packet which is the receivable protocol type and transmitting the read data packet to a main memory used in the processing by the CPU.

The control method may further include transmitting information related to a protocol type of the transmitted data packet to the CPU.

The predetermined receivable protocol type may depend on an Open Systems Interconnection (OSI) reference model.

The foregoing and/or other aspects of the present general inventive concept may be achieved by providing an interface apparatus of an image forming apparatus that processes a data packet containing print data and performs a printing operation on the basis of the print data, the interface apparatus including an interface unit to receive the data packet from a host apparatus via a network and transmits the received data packet to the image forming apparatus and a controller to selectively transmit the received data packet to the image forming apparatus depending on whether the data packet received by the interface unit corresponds to a predetermined receivable protocol type.

The interface apparatus may include a memory unit to store the received packet and a direct memory access (DMA) unit that reads the stored data packet and transmits print data of the stored data packet to the image forming apparatus.

The controller may delete a stored data packet which does not have the predetermined receivable protocol type from among a plurality of stored data packets to prevent print data of a deleted data packet from being transmitted by the DMA unit.

The controller may delete a received data packet which does not correspond to the predetermined receivable protocol type and the controller otherwise transmits the received data packet to the image forming apparatus.

The foregoing and/or other aspects of the present general inventive concept may be achieved by providing a control method an image forming apparatus including receiving a data packet having print data and a protocol type from a host apparatus, parsing the received data packet to determine the protocol type, selectively transmitting print data of a received data packet to a printing unit of the image forming apparatus depending on whether the determined protocol type corresponds to a predetermined protocol type and printing the print data of the data packet having a determined protocol type which corresponds to the predetermined protocol type.

The control method where the parsing of the data packet may include checking a protocol type identifier or a receive descriptor of the received data packet.

The control method where selectively transmitting print data may be performed by a controller which deletes a received data packet which does not have a protocol type which corresponds to the predetermined protocol type and the controller otherwise transmits print data of an undeleted received data packet to the printing unit.

The foregoing and/or other aspects of the present general inventive concept may also be achieved by providing an image forming apparatus including a data receiving unit to receive a data packet from a host apparatus, a processing unit to parse the received data packet to determine a protocol type and a controller to selectively transmit a data packet to the processor depending on whether the determined protocol type corresponds to a predetermined receivable protocol type.

The image forming apparatus may include a printing unit to print information associated with the data packet transmitted to the processor.

The controller may include a media access controller.

BRIEF DESCRIPTION OF THE DRAWINGS

These and/or other aspects and utilities of the present general inventive concept will become apparent and more readily appreciated from the following description of the embodiments, taken in conjunction with the accompanying drawings, in which.

DETAILED DESCRIPTION OF THE PREFERRED EMBODIMENTS

Figure 1:
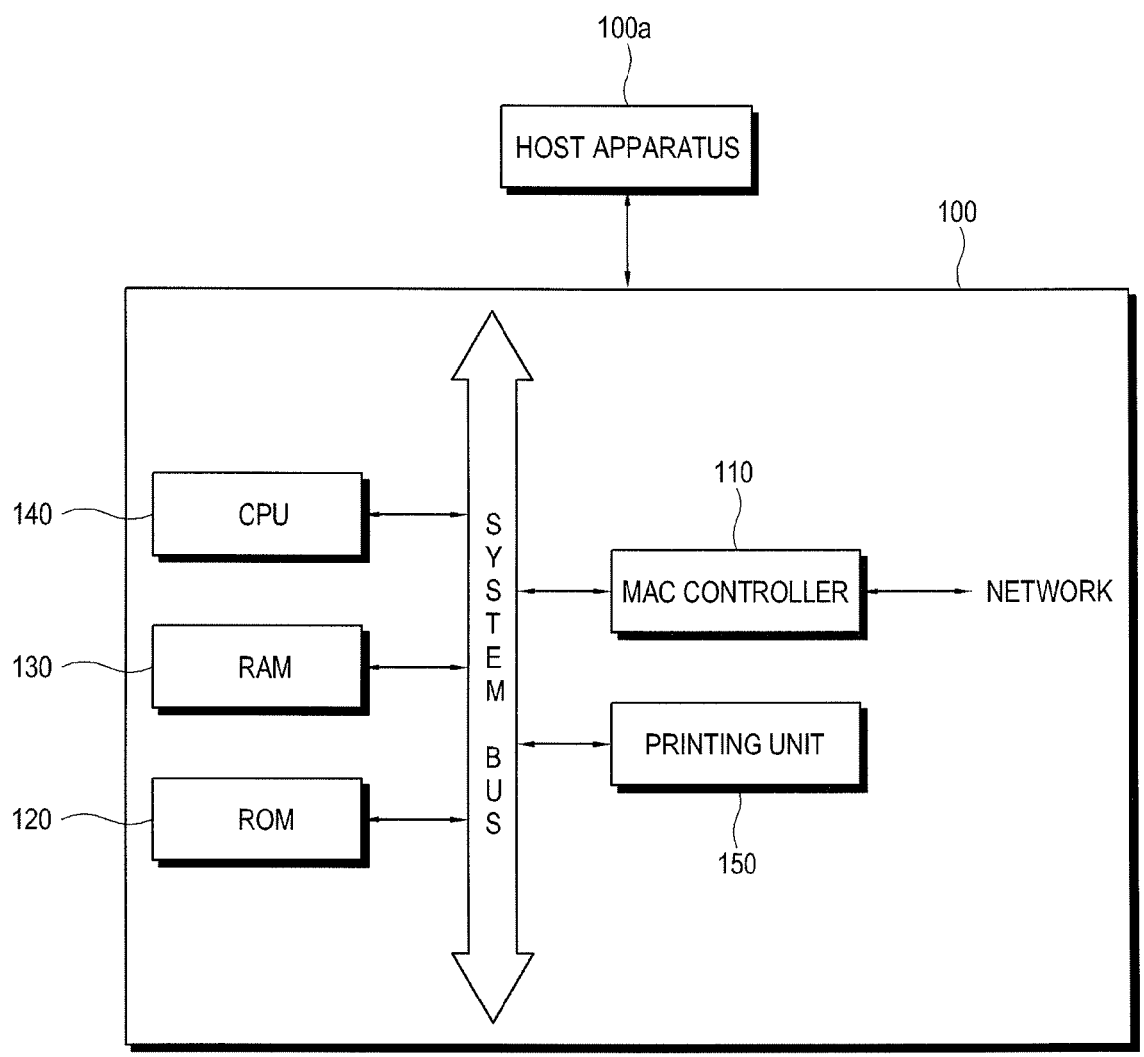
FIG. 1 is a block diagram illustrating a configuration of an image forming apparatus according to an embodiment of the general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a block diagram illustrating a configuration of an image forming apparatus 100 according to an embodiment of the general inventive concept. An image forming apparatus 100, which may be embodied by a network printer or the like, receives print data from a host apparatus 100a, such as a computer system, via a network, and performs a printing operation for the received print data.

The image forming apparatus 100 includes a media access control (MAC) controller 110, a read only memory (ROM) 120, a random access memory (RAM) 130, a central processing unit (CPU) 140 and a printing unit 150, all of which are connected via a system bus. The MAC controller 110 receives data packets containing the print data from the host apparatus 100a via the network. The MAC controller 110 analyzes the protocol type of the received data packets and interrupts transmission of the data packets having a protocol type other than a predetermined protocol type which is allowed to be received (hereinafter referred to as "receivable protocol type").

Programs to be executed by the CPU 140 and setup data are stored in the ROM 120. Programs to be executed by the CPU 140 are loaded via the system bus into the RAM 130 which operates as a main memory for image forming apparatus 100. In addition, data related to performance of the operation of the CPU 140 and the data packets transmitted by the MAC controller 110 are stored in the RAM 130. The CPU 140 controls a printing operation by executing at least one of the programs loaded into the RAM 130. The printing unit 150 forms an image on a printing medium such as a paper by performing a printing operation for the print data obtained from the data packets received by MAC controller 110 and stored in the RAM 130 under control of the CPU 140. The combination of the ROM 120, the RAM 130, the CPU 140 and the printing unit 150 is illustrated as an embodiment of the image forming apparatus of the present general inventive concept.

Figure 2:
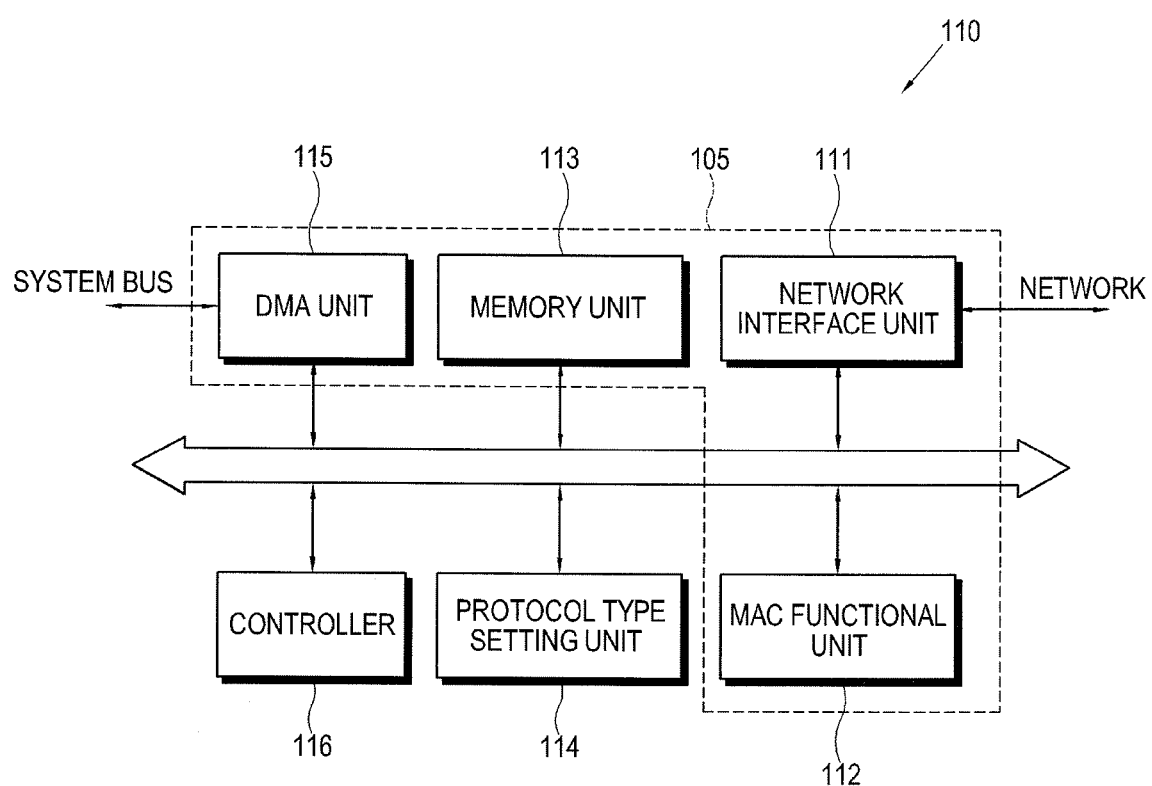
FIG. 2 is a block diagram illustrating a configuration of a MAC controller according to an embodiment of the general inventive concept.

FIG. 2 is a block diagram illustrating the MAC controller 110 according to an embodiment of the present general inventive concept. The MAC controller 110 includes a network interface unit 111, a MAC functional unit 112, a memory unit 113, a protocol type setting unit 114, a direct memory access (DMA) unit 115 and a controller 116. The combination of the network interface unit 111, the MAC functional unit 112, the memory unit 113 and the DMA unit 115 as illustrated defines an embodiment of a data receiving unit 105 (hashed line) of the image forming apparatus 100 of the general inventive concept. The MAC controller 110 may be a system-on-a-chip (SOC) type device. The MAC controller 110 is an example of an interface apparatus of the image forming apparatus 100 of the present general inventive concept.

The network interface unit 111 receives data packets containing print data from the network. The image forming apparatus 100 may further include a physical layer interface chip (PHY chip) (not illustrated) that performs a communication operation according to a protocol corresponding to a physical layer of an Open Systems Interconnection (OSI) reference model, and the network interface unit 111 may receive data packets through communication with the PHY chip. The network interface unit 111 may employ a Media Independent Interface ("MII") system for a data transfer rate of 100 Mbps, a Gigabit Media Independent Interface/Reduced Gigabit Media Independent Interface ("GMII/RGMII") system for a data transfer rate of 1 Gbps, and other known data protocol systems.

The MAC functional unit 112, which is a block that performs a typical MAC function, performs operations of preamble/Standard Data Format (SDF) detection, Cyclic Redundancy Check (CRC) check, and other known operations for the data packets of the received print data.

The data packets of the print data processed by the MAC functional unit 112 are temporarily stored in the memory unit 113. The memory unit 113 may be a RAM.

A receivable protocol type is selected and set in the protocol type setting unit 114. Specifically, information corresponding to a selected protocol type for the received data packets is stored in the protocol type setting unit 114.

The DMA unit 115 reads the data packets stored in the memory unit 113 under control of the controller 116 and transmits the read data packet to the RAM 130 (refer to FIG. 1) via the system bus. The DMA unit 115 generates an interrupt to the CPU 140 when a data packet is transmitted to the RAM 130. In addition, when the DMA unit 115 transmits a data packet to the RAM 130, it transmits information related to the protocol type of the data packet (hereinafter referred to as "protocol type information").

The controller 116 parses the data packets of the received print data by referring to the protocol type setting unit 114 for the selected receivable protocol type for the received print data and controls the DMA unit 115 to selectively transmit the data packets to the RAM 130 depending on whether or not the data packets correspond to the selected receivable protocol type.

The CPU 140 performs a so-called "software protocol stack operation" or "software protocol stack process" on the data packets of the received print data which have been transmitted to the RAM 130. Therefore, according to this embodiment, as the MAC controller 110 interrupts data packets of an unselected protocol type in advance before the data packets of the print data having the selected protocol type are transmitted to the CPU 140, overloading of the CPU 140 and the system bus can be reduced, thereby improving performance of the overall system.

Figure 3:
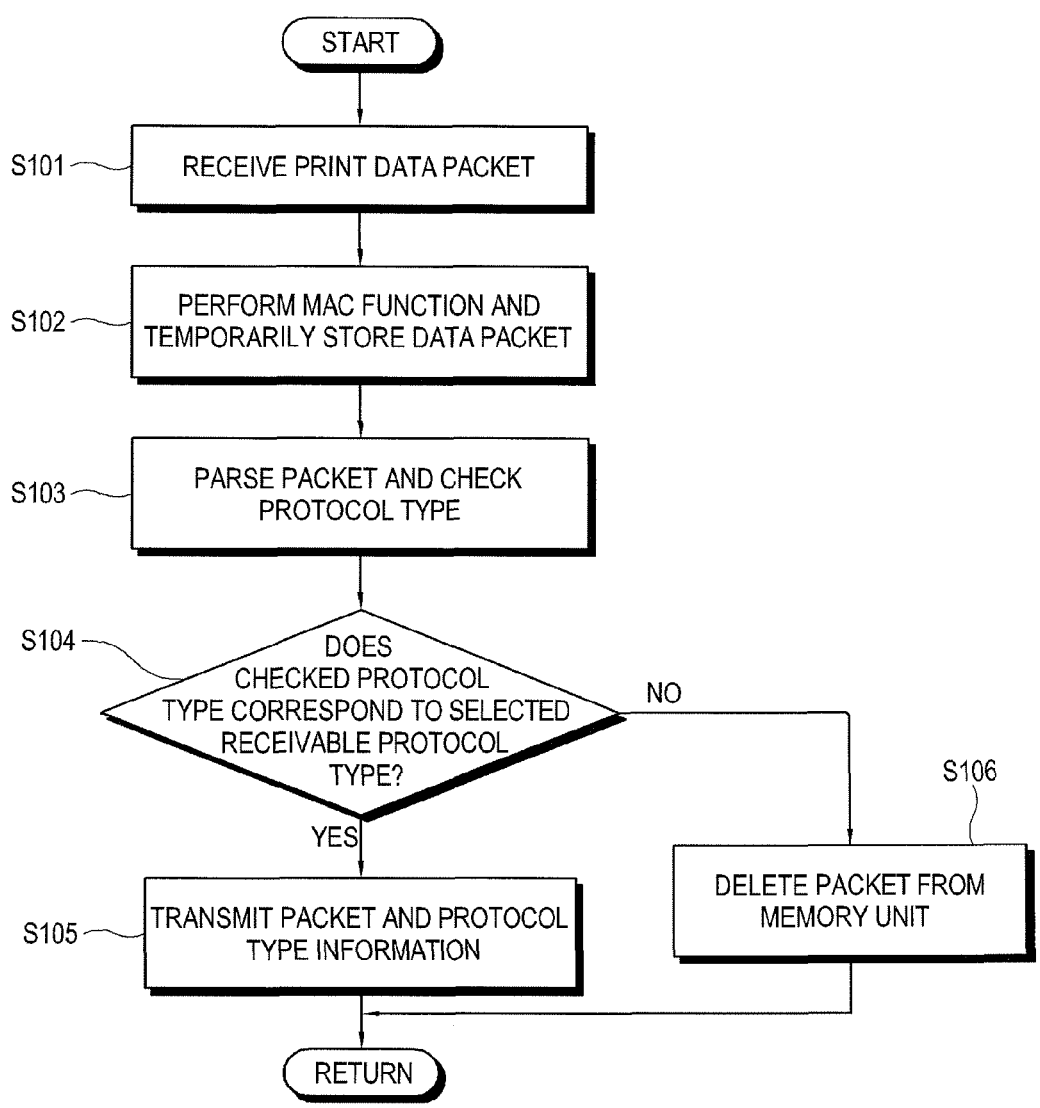
FIG. 3 is a flow chart illustrating an operation of the image forming apparatus according to an embodiment of the general inventive concept.

FIG. 3 is a flow chart illustrating a process of the image forming apparatus 100 according to an embodiment of the present general inventive concept. First, the network interface unit 111 receives the print data packets from a PHY chip at operation S101. The MAC functional unit 112 then performs the MAC function for the received data packets, and the data packets are temporarily stored in the memory unit 113 at operation S102.

Next, the controller 116 parses the received data packets to check the protocol type of the data packets at operation S103. In addition, the controller 116 checks whether or not the checked protocol type corresponds to a receivable protocol type selected and set in the protocol type setting unit 114 at operation S104. The following table 1 illustrates an example of the protocol type of the data packets in this embodiment.

TABLE 1

| Protocol type identifier | Protocol | Upper layer protocol |
| --- | --- | --- |
| 0x1000 | Appletalk | — |
| 0x2000 | ARP | — |
| 0x3000 | DLC | — |
| 0x4100 | IP | ICMP |
| 0x4200 | | ICMP |
| 0x4300 | | TCP |
| 0x4400 | | UDP |
| 0x4400 | | Others |
| 0x5000 | IPv6 | — |
| 0x6100 | IPX | NPC |
| 0x6200 | | SAP |
| 0x6300 | | SPX |
| 0x6400 | | Others |
| 0x7000 | RARP | — |
| 0x8000 | Others | — |

In Table 1, the protocol type identifier is a value identifying a protocol type. The controller 116 parses a frame header of layer 2 and a frame header of layer 3 of the received data packets to determine a protocol type of the data packets.

The protocol type setting unit 114 includes a plurality of protocol filter setting registers (not illustrated) to set the receivable protocol type. Table 2 illustrates an example of the protocol filter setting registers.

TABLE 2

| Bit number | Bit name | Description |
| --- | --- | --- |
| [15:0] | Receivable or not | 1: receivable<br>0: not receivable |
| [31:16] | Protocol type identifier | — |

As illustrated in Table 2, a protocol type identifier is stored in the upper 16 bits of each of the protocol filter setting registers and information to determine whether a data is to be received is stored in the lower 16 bits. For example, if a value of a protocol filter setting register is 0'50000001, it means that IPv6 data packets are receivable.

If it is checked at the operation S104 that the checked protocol type of the data packets corresponds to a receivable protocol type, the controller 116 controls the DMA unit 115 to transmit the data packets and the corresponding protocol type information to the RAM 130 at operation S105. On the other hand, if it is checked at the operation S104 that the checked protocol type of the data packet does not correspond to the set receivable protocol type, at operation S106 the controller 116 deletes the data packet from the memory unit 113 so that the DMA unit 115 can not transmit the data packet. After the operations S105 and S106 are performed, the process returns to operation S101.

When the data packets transmitted by the DMA 115 are stored in the RAM 130, information related to receipt of the data packets may be stored in a pre-assigned address of the RAM 130 in the form of a descriptor (hereinafter referred to as "receive descriptor") along with the data packets.

Figure 4:
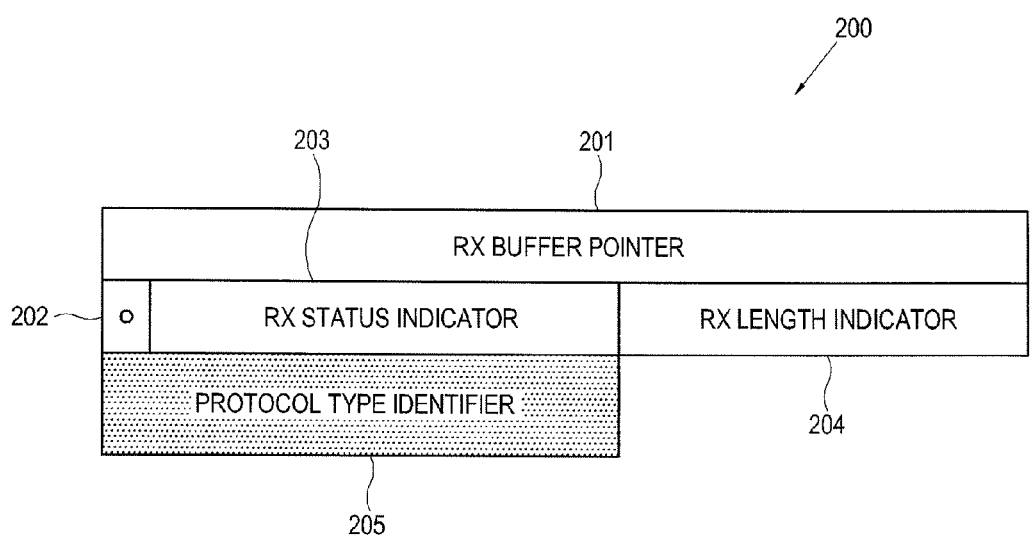
FIG. 4 is a view illustrating an example of a receive descriptor according to an embodiment of the general inventive concept.

FIG. 4 illustrates an example of a receive descriptor (Rx descriptor) 200 according to an embodiment of the present general inventive concept. The receive descriptor 200 includes a receive (Rx) buffer pointer 201 that indicates an address of stored data packets, an ownership bit 202 that indicates ownership by the CPU 140 or the DMA unit 115, a receive (Rx) status indicator 203 that indicates a receive status, a receive (Rx) length indicator 204 that indicates the length of received data, and a protocol type identifier 205. The protocol type identifier 205 is assigned a protocol type information of the data packets transmitted by the DMA unit 115.

As described above, the data packets and the corresponding protocol type are stored together in the form of receive descriptor 200 in the RAM 130 so that the CPU 140 may not classify the data packets again when the data packets are processed, thereby reducing a system load on the CPU 140.

As apparent from the above description according to the present general inventive concept, a system load can be minimized by selectively transmitting data packets of print data received according to a certain protocol type. That is, by preventing transmission of data packets of an undesired protocol type in advance by means of MAC functional unit 112, and not CPU 140, overhead loads on the CPU 140 and the system bus can be reduced, thereby improving overall performance of the system.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus connectable to a network, the image forming apparatus comprising:
   a MAC controller to receive and parse at least one packet from a host apparatus, and transmit the packet selectively in accordance with parsing results;
   a main memory to store the packet transmitted from the MAC controller;
   a central processing unit (CPU) coupled to the main memory to process the packet stored in the main memory; and
   a printing unit controlled by the CPU to perform a printing operation in accordance with the packet processed by the CPU;
   the MAC controller comprising:
     a network interface unit to receive the at least one packet from the host apparatus;
     a memory unit in which the received packet is stored;
     a protocol type setting unit to set a receivable protocol type of the packet; and
     a controller to selectively transmit the packet stored in the memory unit to the main memory if the stored packet corresponds to the receivable protocol type set in the protocol type setting unit and to prohibit the transmission of the packet stored in the memory unit of the MAC controller to the main memory by deleting the stored packet if the stored packet does not correspond to the receivable protocol type set in the protocol type setting unit,
   wherein, when the packet stored in the memory unit of the MAC controller is transmitted to the main memory, the CPU is operable to process the packet stored in the main memory to generate image data and control the printing unit to perform a printing operation based on the generated image data,
   wherein the controller of the MAC controller is adapted to reduce a load on the CPU coupled to the main memory by prohibiting the transmission of the packet stored in the memory unit of the MAC controller to the main memory.

2. The image forming apparatus according to claim 1, wherein the receivable protocol type depends on an Open Systems Interconnection (OSI) reference model.

3. The image forming apparatus according to claim 1, wherein the MAC controller is integrally formed on a system-on-a-chip (SOC).

4. The image forming apparatus according to claim 1, wherein the printing unit prints print data if the packet comprises the print data and corresponds to the receivable protocol type.

5. The image forming apparatus according to claim 1, wherein the controller transmits the packet to the CPU if the packet corresponds to the receivable protocol type, but deletes the packet if the packet does not correspond to the receivable protocol type.

6. The image forming apparatus according to claim 1, further comprising a main memory to which the packet to be processed by the CPU is loaded,
   wherein the MAC controller further comprises a direct memory access (DMA) unit to read the packet stored in the memory unit and transmit the read packet to the main memory.

7. The image forming apparatus according to claim 2, wherein the controller controls the DMA unit to transmit the packet stored in the memory unit to the main memory if the packet stored in the memory unit corresponds to the receivable protocol type.

8. The image forming apparatus according to claim 2, wherein the DMA unit transmits information related to a protocol type of the transmitted packet to the main memory.

9. An image forming apparatus connectable to a network, the image forming apparatus comprising:
   a MAC controller to receive and parse a packet from the network, and transmit the packet selectively in accordance with parsing results;
   a main memory to store the packet transmitted from the MAC controller;
   a central processing unit (CPU) coupled to the main memory to process the packet stored in the main memory; and
   a printing unit to perform a printing operation in accordance with the packet processed by the CPU,
   wherein the MAC controller receives packets via the network and reduces a load on the CPU coupled to the main memory by selectively prohibiting transmission of packets received via the network to the main memory when the MAC controller determines that the received packet does not correspond to a receivable protocol type set in a protocol type setting unit of the MAC controller and deletes the received packet that does not correspond to the receivable protocol type.

* * * * *